Feb. 16, 1960   E. JUSTI ET AL   2,925,454
DIRECT PRODUCTION OF ELECTRICAL ENERGY FROM LIQUID FUELS
Filed Feb. 9, 1956
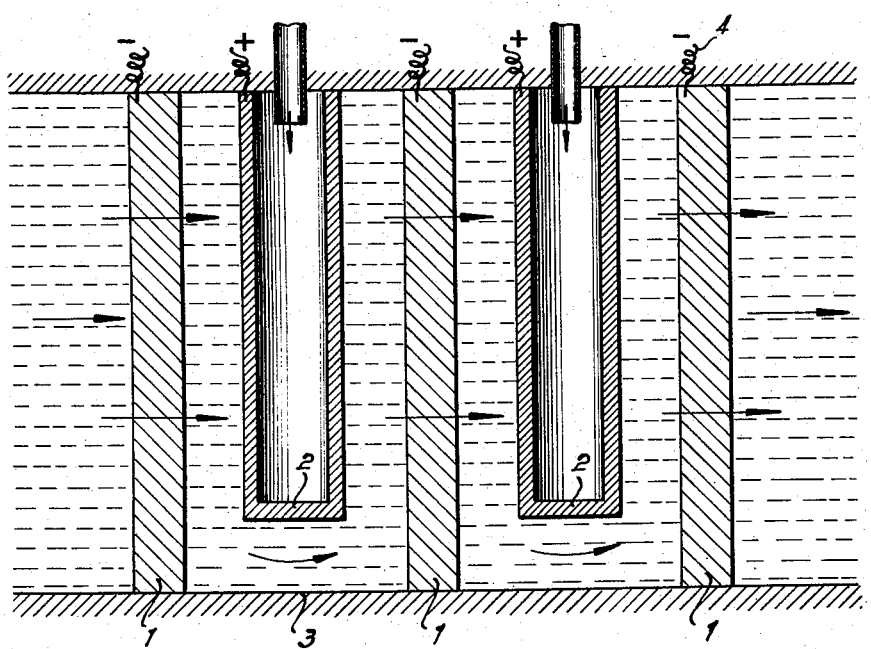
INVENTORS
EDUARD JUSTI and AUGUST WINSEL
by Burgess, Dinklage & Sprung
ATTORNEYS United States Patent Office 2,925,454
Patented Feb. 16, 1960

2,925,454
DIRECT PRODUCTION OF ELECTRICAL ENERGY FROM LIQUID FUELS

Eduard Justi and August Winsel, Braunschweig, Germany, assignors to Ruhrchemie Aktiengesellschaft, Oberhausen-Holten, Germany, and Steinkohlen-Elektrizitat Aktiengesellschaft, Essen-Ruhr, Germany, a corporation of Germany Application February 9, 1956, Serial No. 564,607
20 Claims. (Cl. 136—86)

This invention relates to new and useful improvements in the direct production of electrical energy from liquid fuels.

Fuel cells for the direct production of electrical energy from fluid fuels are known. These cells comprise a fuel electrode and an oxygen electrode, which are spaced apart in an electrolyte bath. The electrodes are generally in the form of hollow bodies, such as hollow cylindrical bodies, and a gaseous oxidizing agent, such as oxygen, air or halogen is passed to the interior of the oxygen electrode, while a liquid or gaseous fuel is passed to the interior of the fuel electrode. The oxidizing gas and the fuel are adsorbed and de-adsorbed in the pores of the oxygen and fuel electrodes, respectively, leaving these electrodes in the form of ions with the electrode bodies remaining electrically charged. The ions may then recombine in the electrolyte solution.

In our co-pending application, Serial No. 472,084, an electrode body is described which is particularly adaptable for use as an oxygen electrode in a fuel cell. This electrode comprises a shaped porous carbon body, as, for example, a hollow, cylindrical, porous, carbon body, having an average pore diameter of 10–100 Angstrom units and an inner surface area of 10–50 square meters per gram. The electrode body is produced by rapidly heating a shaped carbon electrode body to a temperature above about 650° C. and suddenly cooling the body, as, for example, by quenching, to temperatures below about 50° C., and repeating the heating and cooling operation at least one additional time.

In our co-pending application, Serial No. 542,434, a double skeleton catalyst electrode is described, which is particularly well suited for use as a fuel electrode in a fuel cell. The electrode comprises a carrier skeleton having metallic conductivity and 20–80% by weight of Raney catalyst skeleton granules embedded therein. The electrode is preferably in the form of a hollow body, such as a hollow cylindrical body, and is formed by pressing powdered carbon or a lye-resistant powdered metal capable of forming a sinterable mixture with powdered Raney alloy together with powdered Raney alloy under a pressure of about 3,000 and 7,000 kilograms per square centimeter, sintering the pressed mass at a temperature between about 600 and 1,000° C., and thereafter contacting the sintered mass with lye to dissolve aluminum or the other inactive component of the Raney alloy, thus forming a Raney catalyst.

The Raney alloy is preferably a Raney nickel aluminum alloy, but may be any alloy which is composed of two or more components, the active component of which, after dissolving out of the inactive component, shows a catalytic effect. Examples of the active component include, in addition to nickel, cobalt and iron, while examples of the inactive component include, in addition to aluminum, silicon, magnesium, and zinc. The Raney alloys as herein contemplated have been described for example in United States Patents 1,563,787 and 1,628,191 as well as in French Patent 729,357.

Fuel cells with this highly active double skeleton catalyst electrode, may be operated with liquid electrolytes at relatively low temperatures of, for example, between 20 and 90° C. and produce at these low temperatures a sufficiently high current density. Moreover, these electrodes have a high mechanical strength and long operational life. In the case of such diffusion electrode, the gaseous or liquid fuel is normally passed into the porous electrode body from the inside, while the electrolyte enters from the outside. The interphase between the fuel and electrolyte phases is in the interior of the porous body and establishes with the electrode surface a three-phase boundary, which alone is electro-chemically active. This three-phase boundary constitutes only a very small fraction of the inner electrode surface, so that, in effect, only a very small fraction of the inner electrode surface is effective for the current-producing process. This results in a high internal resistance $R_i$, for the cell, and a low-current density.

One object of this invention is to increase the current density and decrease the internal resistance of fuel cells of the above-mentioned type, which are operated with liquid fuels. A further object of this invention is a novel fuel cell for the direct production of electrical energy from liquid fuels, which has a low internal resistance and produces a high current density. These, and still further objects, will become apparent from the following description, read in conjunction with the drawing, which diagrammatically shows a vertical section of an embodiment of a fuel cell in accordance with the invention.

In accordance with the invention it has been found that it is not necessary in the operation of a fuel cell to pass the liquid fuel directly in contact with the fuel electrode, as, for example, into the hollow interior thereof, but that the fuel may be completely intermixed with the electrolyte solution, provided that the liquid fuel and the oxygen electrode are substantially inert with respect to each other.

In connection with water-soluble liquid fuels, such as methyl or ethyl alcohol, the same may be directly mixed with the electrolyte solution, while in connection with water-insoluble fuels the same may be mixed after the addition of a dissolving intermediary.

In accordance with the invention, the liquid fuel, as, for example, a water-soluble liquid fuel, such as ethyl or methyl alcohol, is no longer separately filled into the hollow space of the fuel electrode, but is simply mixed with the electrolyte, as, for example, with a 6-normal KOH solution. Into this liquid mixture, there is immersed on the one hand the fuel electrode, comprising, for example, a double skeleton catalyst electrode as described in our co-pending application, Serial No. 542,434, and, on the other hand, the oxygen electrode, the material of which must behave indifferently to the dissolved fuel in order that an electro-chemical oxidation of the fuel does not occur at the oxygen electrode. The resistance of an $O_2$ electrode to a liquid fuel must be experimentally determined in each case.

When directly mixing a water-soluble fuel as, for example, an alcohol with the electrolyte, the admissible concentration of the fuel is substantially given by the conductivity of the mixture which, for economic reasons, should not be too low. An advantageous value for alcohol is about 5–10% by weight, but this value may be varied within the range of 2–20% by weight. Suitable mixing ratios must be experimentally determined for any given fuel.

Examples of water-soluble fuels which may be used are alcohols, ketones and ethers with not too high a number of carbon atoms. Examples of fuels which are insoluble in water and, therefore, require a dissolving intermediary are paraffin with not more than 12–14 carbon atoms and corresponding aromatic hydrocarbons. Suitable dissolving intermediaries are the so-called neutral soaps which consist of a high molecular weight fatty acid radical bearing 3-20 ethylene oxide groups and an alcohol radical. Water readily adds to the oxygen bridges between the ethylene oxide groups, and this water then constitutes the basis for additions of ions and consequently for an electrical conductivity.

The oxygen electrode preferably consists of a shaped porous carbon body having an average pore diameter of 10-100 Angstrom units and an inner surface area of 10-50 square meters per gram, as described in our copending application, Serial No. 472,084.

The fuel electrode used in accordance with the invention no longer need be hollow, as was conventional, but may, for example, be in the form of a sheet, solid rod, cylinder, or the like.

The reaction at the highly active fuel electrode proceeds with the electrolyte and the fuel particles, i.e., both ions and molecules being adsorbed side by side at the entire electrode surface. In being adsorbed, the organic fuel molecules are split by the forces of interaction. The split molecules present in the chemisorbed state at the catalyst surface react with the electrolyte with the taking up of hydroxyl ions (OH−) and give off electrons to the fuel electrode, which is thereby charged negatively. Fresh fuel molecules are continuously supplied from the liquid phase by diffusion to the electrode adsorbent, which continuously furnishes the reaction products back into the electrolyte space by diffusion with a general tendency toward maximum intermixing or disorder.

Since the electrode, electrolyte and fuel adjoin at all points of the fuel electrode surface when the fuel and electrolyte are mixed in accordance with the invention, the entire inner surface area of the fuel electrode is electrochemically active as contrasted to the single boundary between the three phases in connection with the prior art fuel cells in which the liquid fuel was passed through the interior of the electrode body. It is thus possible, in accordance with the invention, by mixing the electrolyte and fuel, to increase the current density of the fuel cell by almost a factor of 10. Moreover, there results in accordance with the invention, a substantial simplification in the construction of the fuel cell, since fuel electrodes can be in any desired solid form and need not be in the form of a shaped hollow body, as was conventionally required.

Due to the use of the entire inner surface of the fuel electrode for the electro-chemical process, the internal resistance of the cell is decreased. With the addition of the fuel, on the other hand, which is generally a poor electric conductor, the specific resistance of the electrolyte increases, so that a portion of the reduction of the internal resistance is negated. The greater the concentration of the fuel in the electrode, the greater is this effect on the specific resistance of the electrolyte increasing the same. On the other hand, the reactions at the fuel electrode proceed more rapidly as the fuel concentration increases, so that the polarization resistance decreases as the concentration increases. Thus the two portions of the internal resistance, $R_i$, i.e., the specific resistance of the electrolyte and the polarization resistance are opposite as functions of the fuel concentration, and lead to optimum mixing conditions, which may be easily ascertained in accordance with the invention for further increasing the efficiency of the cell.

The invention will be described in further detail with reference to the accompanying drawing. The example is given by way of illustration and not limitation.

*Example*

The fuel cell as shown in the drawing is in the form of a container or conduit, of, for example, cylindrical shape, as defined by the walls 3. The oxygen electrodes 2 extend transversely into the center of the cylindrical container and are in the form of hollow, porous, carbon bodies, having, for example, an average pour diameter of 10-100 Angstrom units, and an inner surface area of 10-50 square meters per gram. These electrodes may be produced by heating a shaped carbon body to temperatures above 650° C. and suddenly chilling the heated bodies to temperatures below 50° C. with one or several repetitions of the procedure. Conduits are provided for passing an oxidizing gas into the hollow interior of the oxygen electrodes and a current tap or lead is connected to each oxygen electrode as the positive terminal of the cell. Positioned on each side of each of the oxygen electrodes are the fuel electrodes 1. These fuel electrodes are in the form of solid disc- or cylinder-shaped members so constructed as porous, double-skeleton catalyst electrode bodies, having, for example, a nickel Raney, cobalt or iron Raney catalyst granules as an active component. An electrolyte solution fills the container and is forced to flow therethrough in the direction of the arrows by a pump or the like. Alternately, the cylindrical container may be vertically positioned, and the electrolyte may be allowed to flow through by gravity flow. The electrolyte flows through the small pores of the double-skelton fuel electrodes 1.

The fuel cell, as shown in the drawing, and having a nickel double-skeleton catalyst fuel electrode, is operated at a temperature of 65° C. by passing oxygen into the interior and through the oxygen electrodes 2, and by passing an electrolyte consisting of a 6-normal KOH solution containing ethyl alcohol mixed therein, slowly through the cylindrical container and through the porous fuel electrode 1 in the direction of flow as indicated by the arrows. The cell was measured in the conventional manner against a saturated calomel electrode. The electromotive force measured at the fuel electrode tap 4 amounted to 1.04 volts at 65° C. Since, from the known tables for the change of enthalpy in combustion reactions of alcohol, voltages up to 1.09 volts are calculated, again with respect to calomel and dependent upon the type of finished products, this measured value indicated that in accordance with the invention, a theoretical efficiency of at least 95% was obtainable for infinitesimal loads. In addition, the construction of the fuel cell was substantially simplified and the reduction in the internal resistance and an increase in the current density was obtained as compared to prior-known fuel cells.

At a load of 70 milliamperes per square centimeter which greatly exceeded all of the heretofore known current yields obtained with fuel cells by a factor in the order of magnitude of 10-100, the fuel electrode initially polarized with 0.10 volt. With the electrolyte and fuel admixture remaining stagnant in the cell, the terminal voltage of the cell continuously dropped as a load was applied for an extended time. At a load of 10 milliamperes per square centimeter, the polarization remained at a stationary level of about 0.09 volt.

The drop in the terminal voltage at the high load was believed caused by a diffusion of the combustion products into the pores of the electrode obstructing the same. This difficulty could be largely avoided by using either wide-pore electrodes or by efficient agitation of the electrolyte solution. The difficulty could be overcome in the embodiment shown by slowly passing the electrolyte solution through the cell in the direction of flow as indicated by the arrows, as described above. The electrolyte, as the same passes through the small pores of the fuel electrodes 1, continuously provides a supply of fuel and effects the removal of the combustion products from the active surface of the electrode.

With the operation of the fuel cell in a vertical direction, the fresh electrolyte fuel mixture can slowly percolate through the porous electrodes by its own gravity to the bottom of the container, where the liquid with its reaction products may be regenerated and recycled, as, for example, by pumping to the upper portion of the cell.

If the fuel cell is used with liquid fuels which are not readily miscible with the aqueous electrolyte, as, for example, fuel oil, diesel oil, liquid mineral fuels or the like, the same are mixed in the electrolyte with a dissolving intermediary. Neutral soaps have proven particularly good for this purpose. By the addition of about 10% by weight of such a dissolving intermediary, excellent results may be obtained, with, for example, low-cost fuel oils. It could be found that it is not only the dissolving intermediary in the fuel cell which is consumed and supplies electrical energy in accordance with the invention.

Thus, the invention also makes possible the direct electro-chemical utilization of liquid mineral fuels, which is effected with high efficiency.

While the invention has been described in detail with reference to the specific embodiment shown, various changes and modifications will become apparent to the artisan which fall within the spirit of the invention and the scope of the appended claims.

We claim:

1. A fuel cell for the direct production of electrical energy from a liquid fuel comprising an electrolyte bath containing a liquid fuel which is a member of the group consisting of alcohols, ketones, ethers, paraffins and aromatic hydrocarbons, said group member having not more than 14 carbon atoms in its molecule admixed therein, a porous fuel electrode and a porous oxygen electrode spaced apart in said electrolyte bath for the adsorption and deadsorption as ions of fuel and oxygen, respectively, leaving the electrodes charged, said liquid fuel and oxygen electrode being substantially inert with respect to each other, and means for passing an oxidizing gas in contact with said oxygen electrode.

2. Fuel cell according to claim 1, in which said liquid fuel is a water-soluble fuel dissolved in the electroyte.

3. Fuel cell according to claim 1, in which said liquid fuel is a substantially water-insoluble liquid fuel dissolved in the electrolyte bath with a dissolving intermediary.

4. Fuel cell according to claim 3, in which said dissolving intermediary is a neutral soap present in amount of about 10% by weight.

5. Fuel cell according to claim 1, in which said oxygen electrode is in the form of a hollow-shaped, porous carbon body, having an average pore diameter of 10–100 Angstrom units, and an inner surface area of 10–50 square meters per gram.

6. Fuel cell according to claim 5, in which said fuel electrode is a double-skeleton catalyst electrode.

7. Fuel cell according to claim 1, in which said fuel electrode is a double-skeleton catalyst electrode.

8. Fuel cell according to claim 7, in which said fuel electrode is a nickel double-skeleton catalyst electrode.

9. Fuel cell according to claim 1, including means for moving the electrolyte bath in contact with the electrodes.

10. Fuel cell according to claim 1, in which said fuel electrode is in the form of a substantially solid, nickel double-skeleton catalyst electrode and including means for causing the electrolyte bath to flow through the pores of the fuel electrode and in contact to pass the oxygen electrode.

11. A fuel cell for the direct production of electrical energy from a liquid fuel, comprising a container for an electrolyte bath, a fuel electrode in the form of a substantially solid porous member of double-skeleton catalyst electrode material for the adsorption and de-adsorption of fuel as ions substantially covering the cross-section of said container, a shaped hollow porous oxygen electrode positioned in said container in spaced relationship to the fuel electrode for the adsorption and de-adsorption as ions of oxygen, means for passing an oxidizing gas into the hollow interior of said oxygen electrode, means for passing an electrolyte solution containing a liquid fuel which is a member of the group consisting of alcohols, ketones, ethers, paraffins and aromatic hydrocarbons, said group member having not more than 14 carbon atoms in its molecule dissolved therein into and through the container and through the pores of the fuel electrode.

12. A fuel cell according to claim 11, in which said oxygen electrode is in the form of a porous-shaped carbon body having an inner surface area of 10–50 square meters per gram, and an average pour diameter of 10–100 Angstrom units.

13. In the process for the operation of a fuel cell, having a porous fuel electrode and a porous oxygen electrode for the adsorption and de-adsorption as ions of fuel and oxygen, respectively spaced apart in an electrolyte bath in which a fuel is maintained in contact with the fuel electrode and an oxidizing gas is passed in contact with the oxygen electrode, the improvement which comprises continuously effecting the contact of a liquid fuel which is a member of the group consisting of alcohols, ketones, ethers, paraffins and aromatic hydrocarbons, said group member having not more than 14 carbon atoms in its molecule with the fuel electrode by directly admixing said liquid fuel, substantially inert with respect to the oxygen electrode, with the electrolyte.

14. Improvement according to claim 13, in which said liquid fuel is a water-soluble liquid fuel.

15. Improvement according to claim 13, in which said liquid fuel is a substantially water-insoluble liquid fuel and in which said admixing is effected with the addition of a dissolving intermediary.

16. Improvement according to claim 13, in which the electrolyte containing the liquid fuel admixed therewith is caused to flow through the fuel electrode and in contact with the oxygen electrode.

17. Improvement according to claim 16, in which said flow of the liquid fuel is effected at a flow rate proportional to the operational load of the cell.

18. In the process for the direct production of electrical energy from fuels, in which a porous fuel electrode and a porous oxygen electrode for the adsorption and de-adsorption as ions of fuel and oxygen, respectively are maintained spaced apart in an electrolyte bath, and in which a fuel is maintained in contact with the fuel electrode and an oxidizing gas passed in contact with the oxygen electrode, the improvement which comprises continuously effecting the contact between the fuel electrode and a liquid fuel by admixing said liquid fuel substantially inert with respect to the oxygen electrode and which is a member of the group consisting of alcohols, ketones, ethers, paraffins and aromatic hydrocarbons, said group member having not more than 14 carbon atoms in its molecule with the electrolyte solution.

19. Improvement according to claim 18, in which said liquid fuel is a substantially water-insoluble liquid fuel and in which admixing is effected with the use of a dissolving intermediary.

20. Improvement according to claim 19, in which the electrolyte solution with the admixed liquid fuel is caused to flow through the fuel electrode in contact with the oxygen electrode.

References Cited in the file of this patent

UNITED STATES PATENTS

| 567,959 | Borchers | Sept. 22, 1896 |
| 913,390 | Jungner | Feb. 23, 1909 |
| 2,716,670 | Bacon | Aug. 30, 1955 |

FOREIGN PATENTS

| 4,921 | Great Britain | Oct. 16, 1882 |
| 521,773 | Great Britain | May 30, 1940 |
| 723,022 | Great Britain | Feb. 2, 1955 |

UNITED STATES PATENT OFFICE

CERTIFICATE OF CORRECTION

Patent No. 2,925,454            February 16, 1960

Eduard Justi et al.

It is hereby certified that error appears in the above numbered patent requiring correction and that the said Letters Patent should read as corrected below.

Column 1, line 68, for "1,563,787 and 1,628,191" read -- 1,563,587 and 1,628,190 --.

Signed and sealed this 21st day of April 1964.

(SEAL)
Attest:
ERNEST W. SWIDER

Attesting Officer

EDWARD J. BRENNER

Commissioner of Patents